United States Patent
Ljung et al.

(10) Patent No.: US 11,184,852 B2
(45) Date of Patent: Nov. 23, 2021

(54) WAKE-UP SIGNAL WITH RECONFIGURABLE SEQUENCE DESIGN

(71) Applicant: Sony Corporation, Tokyo (JP)

(72) Inventors: Rickard Ljung, Helsingborg (SE); Nafiseh Mazloum, Lund (SE); Peter C Karlsson, Lund (SE); Basuki Priyanto, Lund (SE)

(73) Assignee: Sony Group Corporation, Tokyo (JP)

( * ) Notice: Subject to any disclaimer, the term of this patent is extended or adjusted under 35 U.S.C. 154(b) by 23 days.

(21) Appl. No.: 16/495,082

(22) PCT Filed: Mar. 20, 2018

(86) PCT No.: PCT/EP2018/057065
§ 371 (c)(1),
(2) Date: Sep. 17, 2019

(87) PCT Pub. No.: WO2018/172375
PCT Pub. Date: Sep. 27, 2018

(65) Prior Publication Data
US 2020/0022081 A1    Jan. 16, 2020

(30) Foreign Application Priority Data

Mar. 20, 2017 (EP) .................... 17161839
Mar. 20, 2017 (EP) .................... 17161876

(51) Int. Cl.
*H04W 52/02* (2009.01)
*H04J 13/00* (2011.01)
(Continued)

(52) U.S. Cl.
CPC ..... *H04W 52/0229* (2013.01); *H04J 13/0048* (2013.01); *H04J 13/0062* (2013.01);
(Continued)

(58) Field of Classification Search
CPC . H04W 52/0229; H04W 8/24; H04W 68/005; H04W 72/042; H04W 72/0466;
(Continued)

(56) References Cited

U.S. PATENT DOCUMENTS 9,525,540 B1 * 12/2016 Shellhammer ...... H04L 27/0008
2011/0194493 A1 * 8/2011 Centonza .......... H04W 52/0235
370/328

(Continued)

OTHER PUBLICATIONS

International Search Report and Written Opinion from corresponding International Patent Application No. PCT/EP2018/057065, dated Jun. 21, 2018, 11 pages.

(Continued)

*Primary Examiner* — Ivan O Latorre
(74) *Attorney, Agent, or Firm* — Tucker Ellis LLP

(57) ABSTRACT

A method, comprises communicating, between a base station (112) and a terminal (130, 130-1-130-4), a downlink control message (4001) indicative of a sequence design of a wake-up signal (4003); and communicating, between the base station (112) and the terminal (130, 130-1-130-4), the wake-up signal (4003) in accordance with the sequence design; and in response to said communicating of the wake-up signal (4003): communicating, between the base station (112) and the terminal (130, 130-1-130-4), at least one further signal (4004, 4005).

20 Claims, 15 Drawing Sheets

(51) Int. Cl.
  *H04W 68/00* (2009.01)
  *H04W 72/04* (2009.01)
  *H04J 13/16* (2011.01)
  *H04L 1/00* (2006.01)
  *H04W 8/24* (2009.01)

(52) U.S. Cl.
  CPC ............ *H04J 13/16* (2013.01); *H04L 1/0004* (2013.01); *H04W 8/24* (2013.01); *H04W 68/005* (2013.01); *H04W 72/042* (2013.01); *H04W 72/0466* (2013.01)

(58) Field of Classification Search
  CPC . H04W 52/0248; H04J 13/16; H04J 13/0048; H04J 13/0062; H04L 1/0004; Y02D 30/70
  See application file for complete search history.

(56) References Cited

U.S. PATENT DOCUMENTS

| | | | | |
|---|---|---|---|---|
| 2014/0112225 | A1* | 4/2014 | Jafarian | H04W 52/0235 370/311 |
| 2014/0185501 | A1* | 7/2014 | Park | H04W 76/28 370/311 |
| 2016/0198240 | A1 | 7/2016 | Kim et al. | |
| 2016/0295633 | A1* | 10/2016 | Baligh | H04W 76/25 |
| 2017/0013553 | A1* | 1/2017 | Huang | H04W 48/08 |
| 2017/0048918 | A1 | 2/2017 | Iwamura et al. | |
| 2017/0332327 | A1* | 11/2017 | Fang | H04L 5/0007 |
| 2017/0347335 | A1* | 11/2017 | Yi | H04W 76/10 |
| 2018/0018185 | A1* | 1/2018 | Sun | H04W 52/0235 |
| 2018/0115952 | A1* | 4/2018 | Shellhammer | H04W 52/0216 |
| 2018/0249440 | A1* | 8/2018 | Zhang | H04W 68/02 |
| 2018/0270756 | A1* | 9/2018 | Bhattad | H04W 52/0235 |
| 2019/0159127 | A1* | 5/2019 | Son | H04W 52/0219 |
| 2019/0320389 | A1* | 10/2019 | Alanen | H04L 27/02 |

OTHER PUBLICATIONS

CATT, "Motivation of UE Wakeup Mechanism in NR", Datang Telecom Technology & Industry Group, 3GPP TSG RAN Meeting #75, RP-170410, Mar. 6-9, 2017, 8 pages.

Qualcomm Incorporated et al., "WF on Study of wake up signal for NR", 3GPP TSG RAN WG1 NR Ad-Hoc Meeting, R1-1701421, Jan. 16-20, 2017, 4 pages.

Huawei, "Discussion on wake up signal", 3GPP TSG RAN WG1 Meeting #88, R1-1703333, Feb. 13-17, 2017, 6 pages.

Qualcomm Incorporated, "UE Power Evaluation for DRX with Wake-Up Signaling", 3GPP TSG-RAN WG1 NR AdHoc, R1-1700820, Jan. 16-20, 2017, 8 pages.

Intel Corporation, "On further evolution of eMTC and NB-Iot in Rel-15 LTE," 3GPP TSG RAN Meeting #75, RP-170429, Mar. 6-9, 2017, 14 pages.

Qualcomm Incorporated, "Wake-Up Schemes for DRX in NR", 3GPP TSG-RAN WG2 Meeting #97, R2-1701774, Feb. 13-17, 2017, 4 pages.

* cited by examiner

WAKE-UP SIGNAL WITH RECONFIGURABLE SEQUENCE DESIGN

TECHNICAL FIELD

Various examples generally relate to communicating a wake-up signal. Various examples specifically relate to dynamically configuring the wake-up signal.

BACKGROUND

Communication is an integral part of modern life. Reducing energy consumption of wireless communication is an important task to enable various applications such as Internet of Things (IOT) or Machine Type Communication (MTC).

One approach to reduce the energy consumption of wireless communication is to use wake-up technique. Here, a terminal such as a user equipment (UE) includes two receivers, i.e., one main receiver and a low-power receiver. The low-power receiver may implement a comparably simple architecture and, therefore, may consume less power during operation than the main receiver. The low-power receiver can be activated when the main receiver has transitioned into an inactive state. During the time the low-power receiver is activated, it may transition between a receiving and a non-receiving state. Then, the low-power receiver can receive the wake-up signal and, in response to receiving the wake-up signal, the main receiver can transition again to the active state.

Example implementations are described by Third Generation Partnership Project (3GPP) TSG RAN Meeting #74 contribution RP-162286 "Motivation for New WI on Even further enhanced MTC for LTE"; 3GPP TSG RAN Meeting #74 contribution RP-162126 "Enhancements for Rel-15 eMTC/NB-IoT"; and 3GPP TSG RAN WG1 #88 R1-1703139 "Wake Up Radio for NR".

However, such reference implementations face certain restrictions and drawbacks. For example, such reference implementations may be associated with a significant latency associated with wake-up of the main receiver.

As a further example such reference implementations may be associated with a more complex wake-up signal detection than needed for many cases.

SUMMARY

Therefore, a need exists for advanced wake-up techniques. A need exists for wake-up techniques which overcome or mitigate at least some of the above-identified drawbacks and limitations.

This need is met by the features of the independent claims. The features of the dependent claims define embodiments.

A method includes communicating, between a base station and a terminal, a downlink control message. The downlink control message is indicative of a sequence design of a wake-up signal. The method further includes communicating, between the base station and the terminal, the wake-up signal in accordance with the sequence design. The method further includes communicating, between the base station and the terminal, at least one further signal in response to said communicating of the wake-up signal.

It would be possible that the downlink control message is communicated between the base station and a main receiver of the terminal. The wake-up signal may be communicated between the base station and a low-power receiver of the terminal.

Thereby, the sequence design may be adjustable and re-configurable and may allow for a configurable or adjustable design.

A computer program product includes program code to be executed by at least one processor. Executing the program code causes the at least one processor to perform a method. The method includes communicating, between a base station and a main receiver of a terminal, a downlink control message. The downlink control message is indicative of a sequence design of a wake-up signal. The method further includes communicating, between the base station and the low-power receiver of the terminal, the wake-up signal in accordance with the sequence design. The method further includes communicating, between the base station and of the terminal, at least one further signal in response to said communicating of the wake-up signal.

A computer program includes program code to be executed by at least one processor. Executing the program code causes the at least one processor to perform a method. The method includes communicating, between a base station and a terminal, a downlink control message. The downlink control message is indicative of a sequence design of a wake-up signal. The method further includes communicating, between the base station and the terminal, the wake-up signal in accordance with the sequence design. The method further includes communicating, between the base station and the terminal, at least one further signal in response to said communicating of the wake-up signal.

A method includes communicating, between a base station and a receiver of a terminal in a high-power state, a downlink control message. The downlink control message is indicative of a sequence design of a wake-up signal. The method further includes communicating, between the base station and the receiver of the terminal in a low-power state, the wake-up signal in accordance with the sequence design. The method further includes communicating, between the base station and the receiver of the terminal in the high-power state, at least one further signal in response to said communicating of the wake-up signal.

The low-power state may have an associated energy consumption which is smaller than the energy consumption of the high-power state.

A computer program product includes program code to be executed by at least one processor. Executing the program code causes the at least one processor to perform a method. The method includes communicating, between a base station and a receiver of a terminal in a high-power state, a downlink control message. The downlink control message is indicative of a sequence design of a wake-up signal. The method further includes communicating, between the base station and the receiver of the terminal in a low-power state, the wake-up signal in accordance with the sequence design. The method further includes communicating, between the base station and the receiver of the terminal in the high-power state, at least one further signal in response to said communicating of the wake-up signal.

A computer program includes program code to be executed by at least one processor. Executing the program code causes the at least one processor to perform a method. The method includes communicating, between a base station and a receiver of a terminal in a high-power state, a downlink control message. The downlink control message is indicative of a sequence design of a wake-up signal. The method further includes communicating, between the base station and the receiver of the terminal in a low-power state, the wake-up signal in accordance with the sequence design. The method further includes communicating, between the base station and the receiver of the terminal in the high-power state, at least one further signal in response to said communicating of the wake-up signal.

A device includes control circuitry configured to communicate, between a base station and a terminal, a downlink control message indicative of a sequence design of a wake-up signal; and communicate, between the base station and the terminal, the wake-up signal in accordance with the sequence design; and in response to said communicating of the wake-up signal: communicate, between the base station and the terminal, at least one further signal.

A device includes control circuitry configured to communicate, between a base station and a receiver of a terminal in a high-power state, a downlink control message indicative of a sequence design of a wake-up signal; and communicate, between the base station and the receiver of the terminal in a low-power state, the wake-up signal in accordance with the sequence design; and in response to said communicating of the wake-up signal: communicate, between the base station and the receiver of the terminal in the high-power state, at least one further signal.

A terminal includes a main receiver configured to receive, from a base station, a downlink control message indicative of a sequence design of a wake-up signal; and a low-power receiver configured to receive, from the base station, the wake-up signal in accordance with the sequence design. The main receiver is further configured to communicate, with the base station, at least one further signal in response to said receiving of the wake-up signal.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
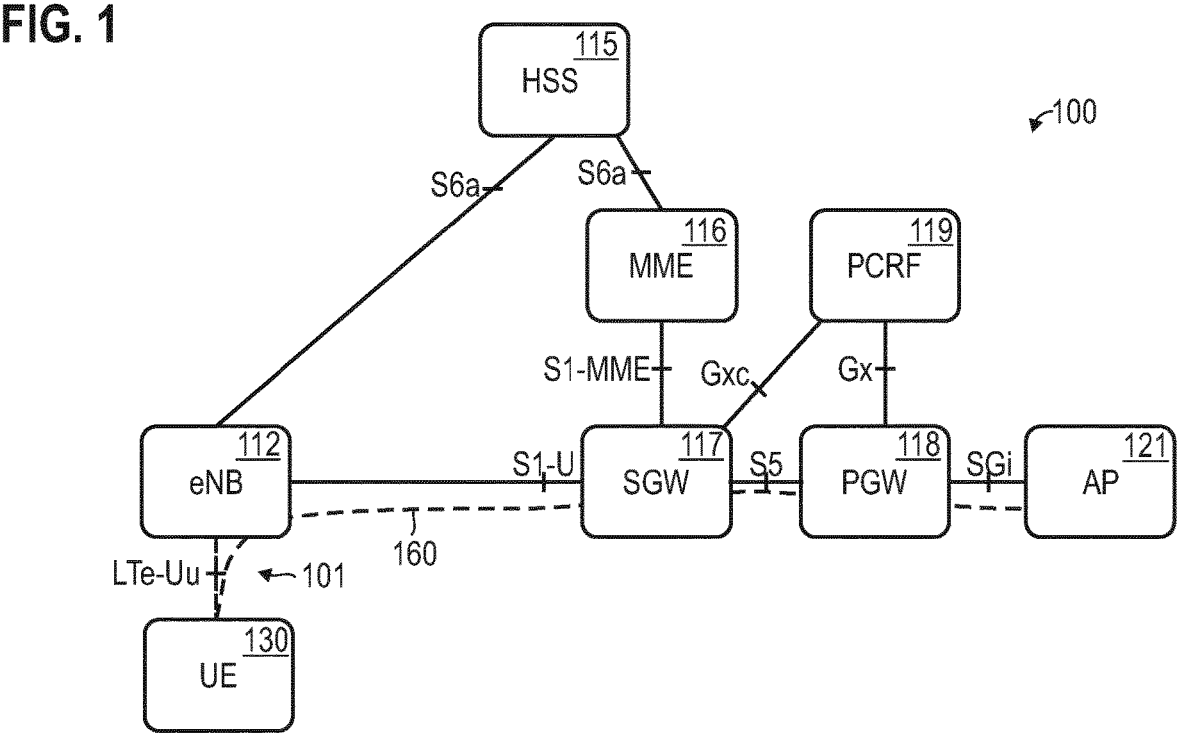
FIG. 1 schematically illustrates a network including a UE and a base station (BS) according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, wake-up techniques are described. The wake-up techniques enable a UE to transition the main receiver into an low-power state, e.g., for power-saving purposes. In some examples, the low-power state of the main receiver may be an inactive state.

In the inactive state the UE only listens to wake-up signals and not to other transmissions, such as paging signals or signals communicated on a payload or higher-layer control channel. For example, a bandwidth on which the UE listens for signals in inactive state may be smaller than in active state. For example, a decoding/demodulation capability may be limited to less complex coding and modulation schemes for inactive state vs. in active state.

Thereby, in the inactive state power consumption can be significantly reduced if compared to an active state of the main receiver. For example, the main receiver may be unfit to receive any data in the inactive state such that some or all components may be shut down. Wake-up of the main receiver from the inactive state is then triggered by a wake-up signal.

The wake-up signal may be received by a dedicated low-power receiver of the UE. The wake-up signal may have a comparably simple modulation, e.g., On-Off Keying or the like, which facilitates a simple time-domain operation by the low-power receiver.

It is expected, but not required that the power consumption consumed by the low-power receiver when receiving the wake-up signal is lower than the power consumption consumed by the main receiver when receiving signals from the base station.

In other examples, the wake-up signal may be received by the main receiver in the low-power state. Here, it may not be required to provision a dedicated low-power receiver.

Various techniques described herein enable to flexible set or reconfigure the sequence design used for constructing a wake-up signal. For example, different sequence designs may be used for different UEs connected to a given BS. This is in contrast to statically determined/pre-designed sequence designs according to reference implementations.

Various examples described herein are based on the finding that, in general, there may be a tradeoff between designing a long and complex sequences for wake-up signals and the resulting wake-up signal performance. The more advanced the methods to scramble bit sequences and the longer spreading, the better detection and false alarm performance, which is related to signal-to-noise and interference performance will be provided. However, transmitting a long sequence will require more radio system capacity, and the low-power receiver complexity will be larger, possibly also resulting in a higher energy consumption.

The techniques described herein may find application in various fields. An example application relates to IOT UEs. Such IOT UEs often transmit and/or receive (communicate) data only once or a few times per day or even per week. The remaining time is idle. In an idle mode, a DRX cycle can be used to repeatedly activate a receiver to receive paging indicators from the network.

FIG. 1 illustrates the architecture of a cellular network 100 according to some examples implementations. In particular, the cellular network 100 according to the example of FIG. 1 implements the 3GPP LTE architecture, sometimes referred to as evolved packet system (EPS). This, however, is for exemplary purposes only. In particular, various scenarios will be explained in the context of a wireless link 101 between a UE 130 and the cellular network 100 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. Similar techniques can also be potentially applied to 5G New Radio (NR), and NR-IoT.

A further particular example is the 3GPP NB-IoT RAT. The 3GPP NB-IoT RAT may be based on the 3GPP LTE RAT, i.e., the Evolved UMTS Terrestrial Radio Access (E-UTRA). Further, the NB-IoT RAT may be combined with the EPS as illustrated in FIG. 1. The various examples disclosed herein may be readily implemented for the 3GPP NB-IoT RAT, alternatively or additionally.

Other examples include other types of networks, e.g., Institute of Electrical and Electronics Engineers (IEEE) 802.11X Wireless Local Area Network, Bluetooth or Zigbee.

The UE 130 is connected via the wireless link 101 to a BS 112 of the cellular network 100. The BS 112 and the UE 130 implement the evolved UMTS terrestrial radio access technology (E-UTRAN); therefore, the BS 112 is labeled evolved node B (eNB) in FIG. 1.

For example, the UE 130 may be selected from the group including: a smartphone; a cellular phone; a table; a notebook; a computer; a smart TV; a MTC device, an IoT device; etc.

An MTC or IoT device is typically a device with a low to moderate requirement on data traffic volumes and loose latency requirements. Additionally, communication employing MTC or IoT devices should achieve low complexity and low costs. Further, energy consumption of an MTC or an IoT device should be comparably low in order to allow battery-powered devices to function for a comparably long duration: The battery life should be sufficiently long. For example, the IoT device may be connected to the EPS via the NB-IoT RAT.

Communication on the wireless link 101 can be in uplink (UL) and/or DL direction. Details of the wireless link 101 are illustrated in FIG. 2.

Figure 2:
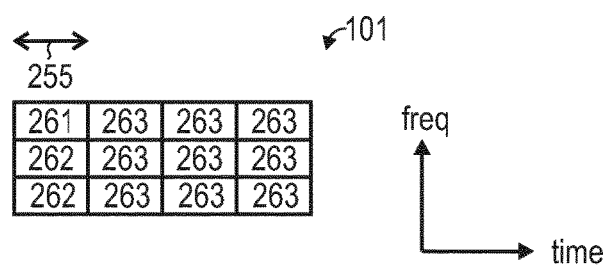
FIG. 2 schematically illustrates various channels implemented on a wireless link of the network according to various examples.

FIG. 2 illustrates aspects with respect to channels implemented on the wireless link 101. The wireless link 101 implements a plurality of communication channels 261-263. Transmission frames 255—e.g., implemented by sub-frames—of the channels 261-263 occupy a certain time duration. Each channel 261-263 includes a plurality of resources which are defined in time domain and frequency domain. For example, the resources may be defined with respect to symbols encoded and modulated according to Orthogonal Frequency Division Multiplexing (OFDM).

For example, a first channel 261 may carry synchronization signals for acquiring a timing of the BS 112.

A second channel 262 may be associated with control messages (control channel 262). The second channel 262 may carry paging signals or paging indicators which enable the network 100—e.g., the MME 116—to page the UE 130 when the UE 130 is in idle mode. The control messages may configure operation of the UE 130, the BS 112, and/or the wireless link 101. For example, radio resource control (RRC) messages and/or HARQ ACKs and NACKs can be exchanged via the control channel. According to the E-UTRAN RAT, the control channel 262 may thus correspond to a Physical DL Control Channel (PDCCH) and/or a Physical UL Control Channel (PUCCH) and/or a Physical Hybrid ARQ indicator Channel (PHICH). At least some of the control messages communicated on the control channel 262 may correspond to Layer 2 or Layer 3 control messages in the Open Systems Interface (OSI) model of a transmission protocol stack, i.e., data link or network layer.

Further, a third channel 263 is associated with a payload messages carrying higher-layer user-plane data packets associated with a given service implemented by the UE 130 and the BS 112 (payload channel 263). User-data messages may be transmitted via the channel 263. According to the E-UTRAN RAT, the payload channel 263 may be a Physical DL Shared Channel (PDSCH) or a Physical UL Shared Channel (PUSCH). Also some control messages may be transmitted via the channel 263, e.g., a paging message.

Turning again to FIG. 1, the BS 112 is connected with a gateway node implemented by a serving Gateway (SGW) 117. The SGW 117 may route and forward payload data and may act as a mobility anchor during handovers of the UE 130.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 1): for this purpose, the PGW 118 is connected with an access point node 121 of the packet data network. The access point node 121 is uniquely identified by an access point name (APN). The APN is used by the UE 130 to seek access to the packet data network.

The PGW 118 can be an endpoint of an end-to-end connection 160 for packetized payload data of the UE 130.

The end-to-end connection 160 may be used for communicating data of a particular service. Different services may use different end-to-end connections 160 or may share, at least partly, a certain end-to-end connection.

The end-to-end connection 160 may be implemented by one or more bearers which are used to communicate service-specific data. An EPS bearer which is characterized by a certain set of quality of service parameters indicated by the QoS class identifier (QCI).

Figure 3:
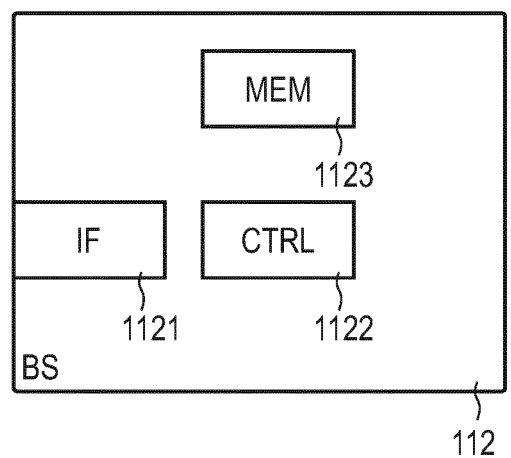
FIG. 3 schematically illustrates a BS according to various examples.

FIG. 3 schematically illustrates the BS 112. The BS 112 includes an interface 1121. For example, the interface 1121 may include an analog front end and a digital front end. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122, e.g.: transmitting wake-up signals; negotiating and/or implementing properties of the wake-up signal; scheduling of devices to resources allocated to wake-up signals; etc.

Figure 4:
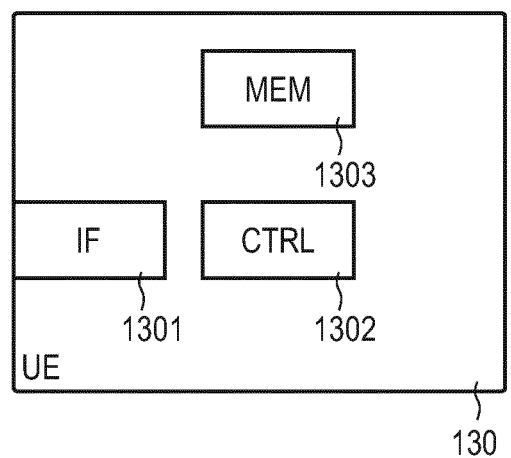
FIG. 4 schematically illustrates a UE according to various examples.

FIG. 4 schematically illustrates the UE 130. The UE 130 includes an interface 1301. For example, the interface 1301 may include an analog front end and a digital front end. In some examples, the interface 1301 may include a main receiver and a low-power receiver. Each one of the main receiver and the low-power receiver may include an analog front end and a digital front end, respectively. The UE 130 further includes control circuitry 1302, e.g., implemented by means of one or more processors and software. The control circuitry 1302 may also be at least partly implemented in hardware. For example, program code to be executed by the control circuitry 1302 may be stored in a non-volatile memory 1303. In the various examples disclosed herein, various functionality may be implemented by the control circuitry 1302, e.g.: receiving wake-up signals; transitioning the main receiver between an inactive state and an active state; implementing a discontinuous reception cycle of the main receiver and/or of the low-power receiver; etc.

Figure 5:
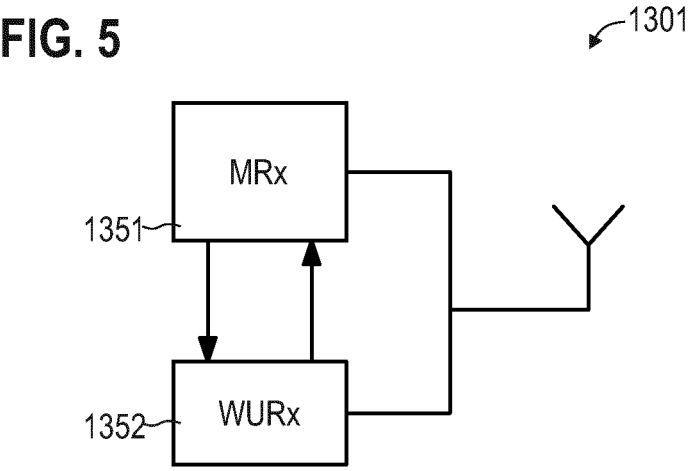
FIG. 5 schematically illustrates an interface of the UE including a main receiver and a low-power receiver according to various examples.

FIG. 5 illustrates details with respect to the interface 1301 of the UE 130. In particular, FIG. 5 illustrates aspects with respect to the main receiver 1351 and the low-power receiver 1352. In FIG. 5, the main receiver 1351 and the low-power receiver 1352 are implemented as separate entities. For example, they may be implemented on different chips. For example, they may be implemented in different housings. For example, they may not share a common power supply.

The scenario FIG. 5 may enable switching off some or all components of the main receiver 1351 when operating the main receiver in inactive state.

Figure 6:
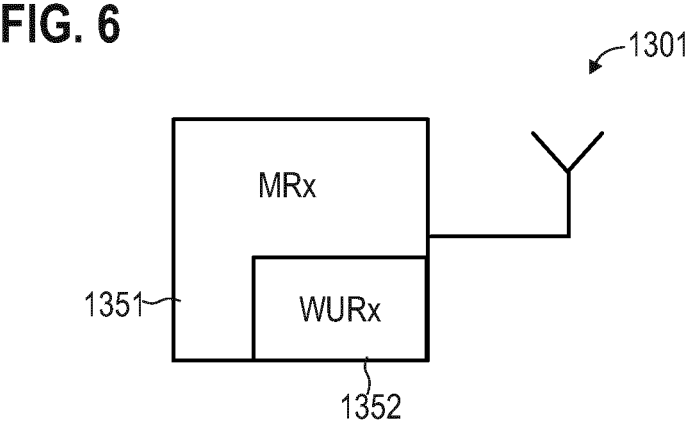
FIG. 6 schematically illustrates an interface of the UE including a main receiver and a low-power receiver according to various examples.

FIG. 6 illustrates details with respect to the interface 1300 and one of the UE 130. In particular, FIG. 6 illustrates aspects with respect to the main receiver 1351 and the low-power receiver 1352. In FIG. 6, the main receiver 1351 and the low-power receiver 1352 are implemented as a common entity. For example, they may be implemented on the common chip, i.e., integrated on a common die. For example, they may be implemented in a common housing. For example, they may share a common power supply.

The scenario FIG. 6 may enable a particular short latency for transitioning between reception by the wake-up receiver 1352 and reception by the main receiver 1351.

While in FIGS. 5 and 6 a scenario is illustrated where the main receiver 1351 and the low-power receiver 1352 share a common antenna, in other examples, it would be also possible that the interface 1301 includes dedicated antennas for the main receiver 1351 and the low-power receiver 1352.

While in the examples of FIGS. 5 and 6 scenarios are illustrated where there is a dedicated low-power receiver 1352, in other examples there may be no low-power receiver. Instead, the wake-up signal may be received by the main receiver 1351 in a low-power state. For example, the main receiver 1351 may not be fit to receive ordinary data other than the wake-up signal in the low-power state. Then, in response to receiving the wake-up signal, the main receiver 1351 may transition into a high-power state in which it is fit to receive the ordinary data, e.g., on PDSCH or PDCCH, etc.

Figure 7:
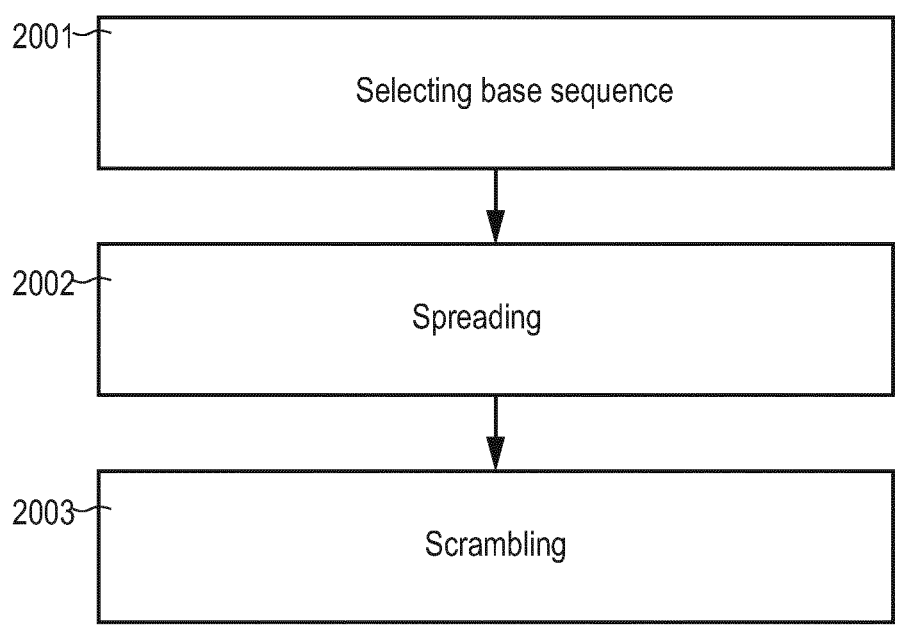
FIG. 7 is a flowchart of a method according to various examples.

FIG. 7 is a flowchart of a method according to various examples. FIG. 7 illustrates aspects with respect to constructing the wake-up signal. For example, the method according to FIG. 7 could be executed by the control circuitry 1122 of the BS 112. FIG. 7 illustrates aspects with respect to a sequence design of the wake-up signal.

First, a certain base sequence is selected, 2001. For example the base sequence may be a randomly generated set of bits. For example the base sequence may be unique for a UE or a group of UEs, and hence may correspond to a UE identity number. For example, the base sequence may be selected from the group including: a Zadoff-Chu sequence; a sequence selected from a set of orthogonal or quasi-orthogonal sequences; a Walsh-Hadamard sequence; a PN sequence; and a M sequence. For example, selecting the particular base sequence or type of base sequence can be subject to sequence design of the wake-up signal. For example, setting the sequence length of the base sequence of the wake-up signal can be subject to sequence design of the wake-up signal. By changing the length of the base sequence of the wake-up signal, it is possible to change the duration of the wake-up signal. For example, the length of the base sequence can be extended by repeating the base sequence multiple-times.

In some examples, different base sequences may be selected for different wake-up signals. In particular, the base sequence may be selected based on an intended recipient of the wake-up signal, i.e., depending on the particular UE 130 to which the wake-up signal is to be transmitted. In other words, it may be possible that the base sequence is uniquely associated with the respective UE 130 as the intended recipient of the wake-up signal. Different UEs may be addressed by different base sequences.

Next, spreading may be applied to the base sequence, 2002. When spreading a bit sequence, the incoming bit sequence is spread/multiplied with a spreading sequence. This increases the length of the incoming bit sequence by a spreading factor K. Hence, by changing the spreading factor K, it is also possible to change the duration of the wake-up signal. A simple implementation of a spreading operation is by repeating the base sequence K times. The resulting bit sequence can be of the same length as the incoming bit sequence times the spreading factor. Details of the spreading can be set by a spreading parameter. For example, the spreading parameter may specify the spreading sequence, e.g., a length of the spreading sequence or individual bits of the spreading sequence. Setting the spreading parameter can be subject to sequence design of the wake-up signal.

Then, scrambling may be applied to the spread base sequence, 2003. Scrambling may relate to inter-changing or transposing a sequence of the bits of the incoming bit sequence according to one or more rules. Scrambling provides for randomization of the incoming bit sequence. Based on a scrambling code, the original bit sequence can be reproduced at the receiver. Details of the scrambling can be set by a scrambling parameter. For example, the scrambling parameter can identify the one or more rules. For example, the scrambling parameter can relate to the scrambling code. Setting the scrambling parameter can be subject to sequence design of the wake-up signal.

In some examples, it may be possible to additionally add a checksum to the wake-up signal. Adding a checksum may be subject to sequence design of the wake-up signal. For example, a checksum protection parameter may set whether to include or to not include the checksum. For example, the checksum protection parameter may set a length of the checksum. For example, the checksum protection parameter may set a type of the checksum, e.g., according to different error-correction algorithms, etc. By adding a checksum to the wake-up signal, the duration of the wake-up signal can be increased.

In some examples, it may be possible to add a preamble to the wake-up signal. The preamble may include a sequence of preamble bits. For example, the sequence of preamble bits may have a specific length. The sequence of preamble bits may enable robust identification of the wake-up signal, e.g., even in presence of burst errors, in presence of large time/frequency drifts, etc. Presence of the preamble, length of the preamble, type of the preamble sequence, spreading parameter, and/or scrambling parameter, etc. can be properties that can be set according to a preamble parameter in sequence design of the wake-up signal. Scrambling can provide a uniqueness in the preamble, such as providing cell identity. By adding a preamble to the wake-up signal, the duration of the wake-up signal can be increased.

According to various examples described herein, various sequence design options of the method according to the example of FIG. 7 can be flexibly adjusted. For example, a spreading parameter and/or a scrambling parameter or the particular type of base sequence can be flexibly adjusted. For example, the sequence design of the wake-up signal may be re-adjusted over the course of time for a given UE. Alternatively or additionally, the sequence design of the wake-up signal may be adjusted differently for different UEs.

Thus, as will be appreciated, there are many different parameters of the sequence design that may be appropriately determined. Examples include one or more of the following: (I) a variable UE identity number size for the network to select, with a specified given range [e.g. 10-100 bits]; (II) a description of different specified sequence generator methods for the network to use, that can provide different levels of cross correlation properties, e.g. a set of randomly generated bits, Zadoff-Chu sequence generation, Walsh-Hadamard sequence generation, etc.; (III) a given range of spreading factors for the network to use; (IV) a selection of different methods for scrambling that the network may select to apply; (V) an option for the network to use additional set of CRC bits, and a range of number of CRC bits for reduced false alarm rates; (VI) an option for the network to include preamble bits, for better detection probability of the wake up sequence. The specification would include design method and range of number of bits for such preamble. As will be appreciated, it is generally possible to set the sequence design to exact values, or use a range within which the specific parameter values may be selected. Hence, the sequence design may be indicative of a range of allowed parameter values of at least one parameter of the sequence design. Thereby, dynamic adjustment becomes possible within a pre-configured framework, e.g., to account for changing channel conditions, etc.

Figure 8:
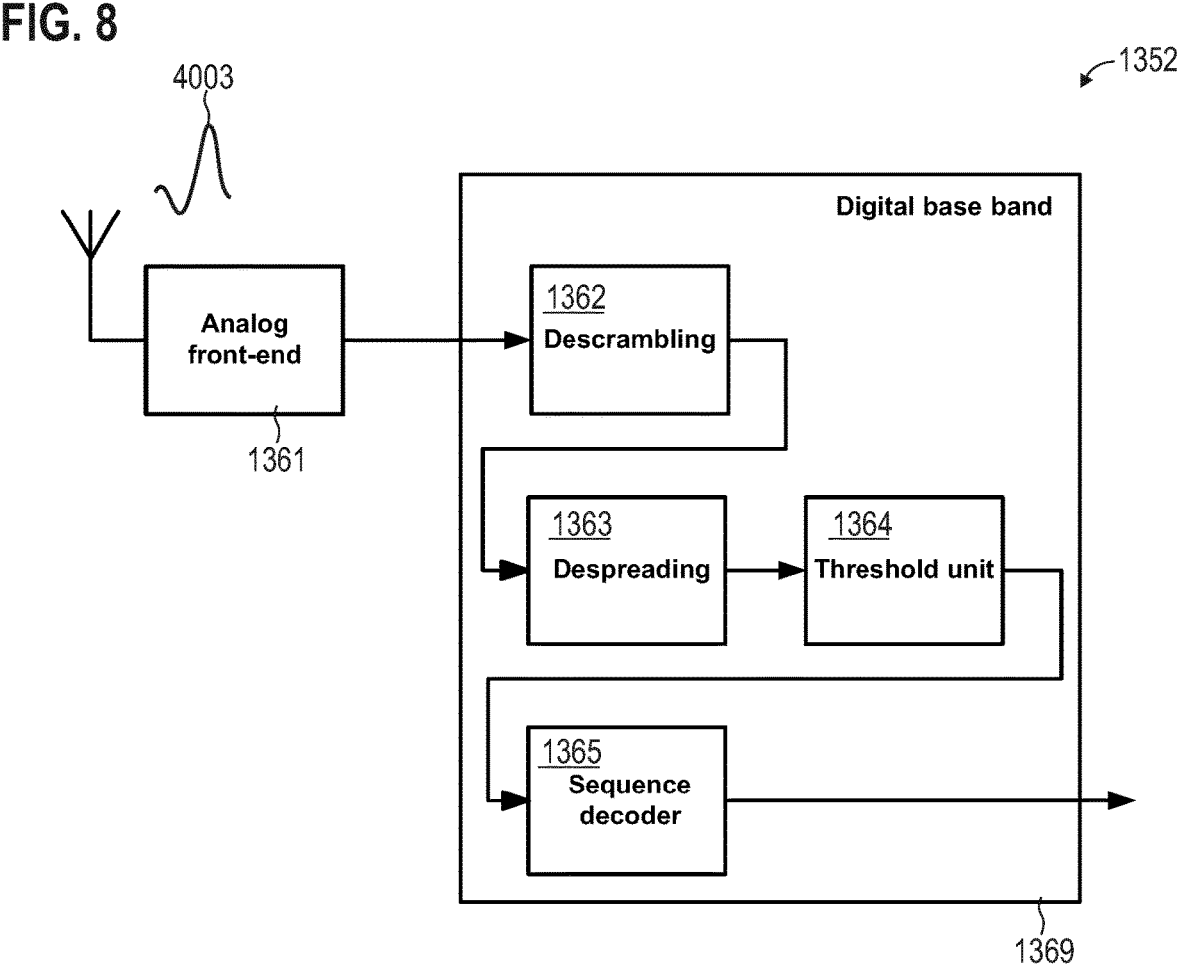
FIG. 8 schematically illustrates details of the low-power receiver according to various examples.

FIG. 8 illustrates aspects with respect to the low-power receiver 1352 of the interface 1301. In the example of FIG. 8, the low-power receiver 1352 includes an analog front end 1361 and a digital front end 1369.

FIG. 8 illustrates aspects with respect to the processing of a wake-up signal 4003 received by the low-power receiver 1352. The analog front end 1361 outputs a bit sequence corresponding to the wake-up signal 4003 in the baseband to the digital front end 1369.

In the various examples described herein, time-domain and/or frequency-domain processing is employed to identify the wake-up signal 4003. Sometimes, respective processing may be with respect to a symbol sequence. Alternatively or additionally, respective processing may be with respect to a bit sequence. For example, processing may be with respect to a symbol sequence if the processing—e.g., correlation—is at the Fast Fourier Transform (FFT) output of the receiver. For example, processing may be with respect to a bit sequence if the processing—e.g., correlation—is after the demodulation output, e.g., after M-QAM or PSK output.

The processing of the wake-up signal by the digital front end 1369 may be comparably simple—e.g., if compared to processing of a paging indicator. In legacy LTE, once the UE is scheduled a paging occasion, i.e., allocated to listen to a paging indicator, the UE is expected to be ready to decode PDCCH. Thus, the paging signal may include a temporary identity such as the P-RNTI and a PDCCH checksum which is scrambled with P-RNTI. The paging indicator may be transmitted on the PDCCH. The PDCCH computation can be energy consuming, especially in MTC and NB-IoT.

Differently, the wake-up signal may be transmitted independent of the PDCCH. Dedicated resources may be allocated to the wake-up signal. The wake-up signal may be transmitted prior to the UE accessing the PDCCH. Once the UE has detected a wake-up signal that is assigned to that UE, then the UE may start to decode the PDCCH.

The wake-up signal may be referred to as a simplified paging indicator, because it may only include the UE identity or group identity and the signals may be constructed a different ways.

The wake-up signal and the paging signal may employ different physical channels. The wake-up signal may not include reference to the P-RNTI—included in the paging signal—for UE-specific identification. The wake-up signal may be designed so that it requires less UE computation/ calculation than reception and decoding of the paging signal.

For example, with respect to the wake-up signal, it may not be preferred to have channel coding such turbo code, convolutional code, etc. The wake-up signal can be a robust signal, such that does not operate with higher order modulation. It can be a lower order modulation, such as On-Of-Keying (OOK), BPSK. The wake-up signal may employ a modulation scheme that has low peak to average power ratio property. The wake-up signal can be a random bits and/or sequence signal that can be unique that can be assigned to a UE or group of UEs.

De-scrambling functionality 1362 then performs de-scrambling.

Next, de-spreading functionality 1363 is applied.

A threshold unit 1364 is provided next.

A sequence decoder 1365 employs a decoding algorithm to the bit sequence. Finally, the base sequence employed at the transmitter is thus reassembled.

It is then possible to perform a cross-correlation between the base sequence and a reference sequence. If the cross correlation yields a significant result, it can be judged that the wake-up signal 4003 was addressed to the particular UE 130 and possibly further UEs. Based on said cross correlating, it is then possible to selectively transition the main receiver 1351 from an inactive state to an active state.

By means of spreading and/or scrambling of the base sequence, more reliable crosscorrelation can be performed. For example, by spreading the base sequence, a longer sequence is obtained for the wake-up signal 4003 transmitted over the air. Longer sequences generally are more robust to false positives when performing the crosscorrelation.

Figure 9A:
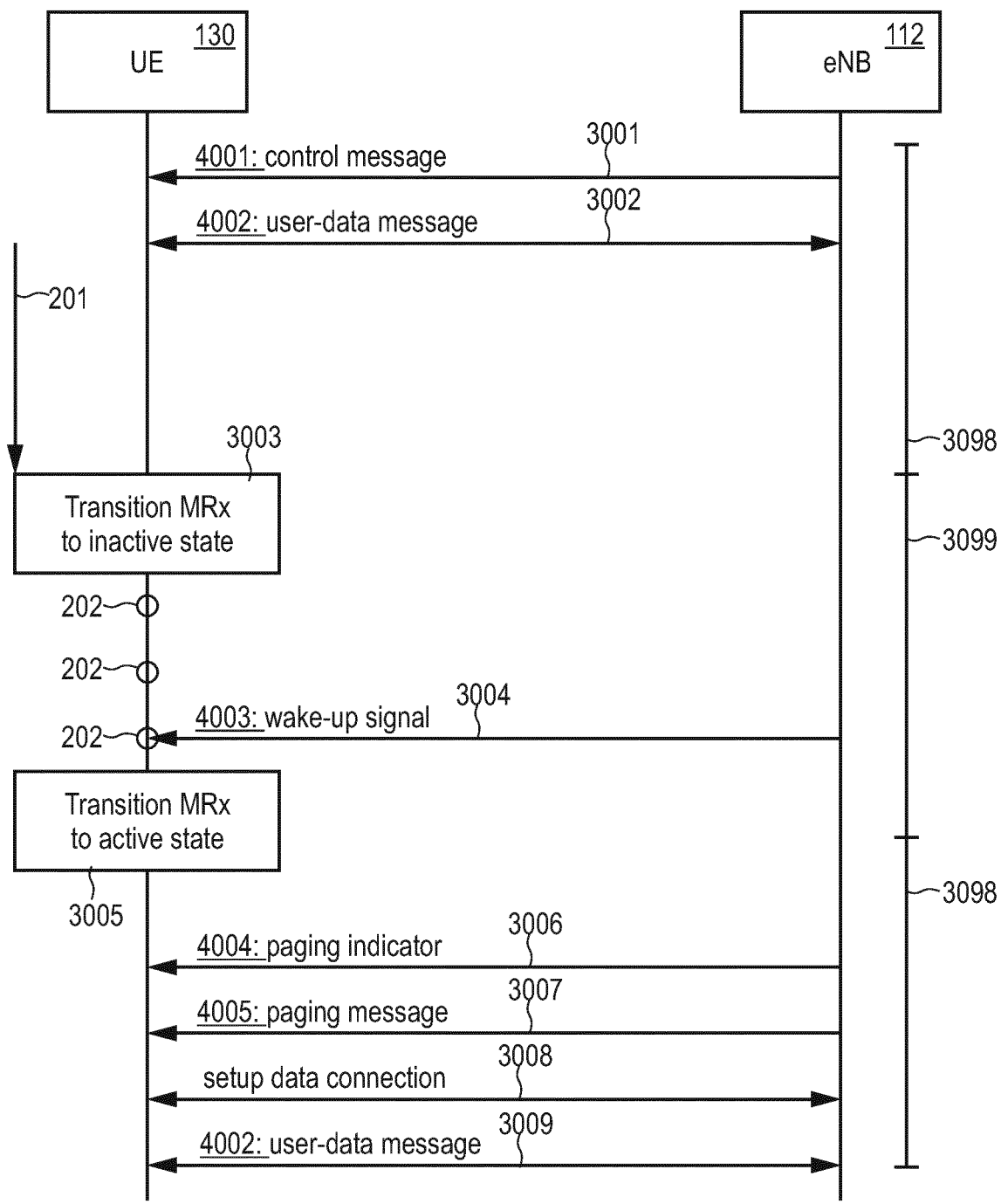
FIG. 9A is a signaling diagram of communication between the BS and the UE according to various examples.

FIG. 9A is a signaling diagram. FIG. 9A illustrates aspects with respect to communicating between the UE 130 and the BS 112. FIG. 9A illustrates aspects with respect to transmitting and/or receiving (communicating) a wake-up signal 4003.

At 3001, a control message 4001 is communicated. For example, the control message may be communicated on the control channel 262, e.g., PDCCH. For example, the control message may be a Layer 2 or Layer 3 control message. The control message may be related to RRC/higher-layer signaling.

The control message 4001 may be indicative of certain properties associated with the wake-up technology implemented by the UE 130 and the wake-up signal configuration by the eNB 112. Further, the control message 4001 could contain configuration information of the preamble, such as its length and transmission periodicity. For example, the control message may configure an inactivity schedule 201 of the main receiver 1351 of the UE 130. For example, the control message 4001 may be indicative of a plurality of reoccurring resources allocated to the wake-up signal 4003. For example, the control message 4001 may be indicative of a modulation and/or coding scheme (MCS). For example, the control message 4001 may be indicative of the sequence design of the wake-up signal 4003. For example, control message 4001 may be indicative the sequence ID of a UE or a group of UEs. For example, control message 4001 may be indicative the supported range/coverage of the wake-up radio mechanism, e.g., normal coverage or CE. For example, the control message 4001 may be indicative of the CE level used for communicating wake-up signals, i.e., the number of repetitions.

By implementing the control message 4001 to be indicative of the sequence design of the wake-up signal 4003, it is possible to dynamically adjust the sequence design of the wake-up signal 4003, e.g., depending on the UE 130 and/or depending on time. Certain properties of the wireless link 101 between the UE 130 and the BS 112 can be taken into account when determining the sequence design. Then, the UE 130 may be informed appropriately.

It would be possible that the control message 4001 is communicated during an attach procedure of the UE 130 to the network 100. For example, the control message 4001 could be communicated while the data connection 160 is active. For example, the control message 4001 could be re-transmitted—e.g., indicating different values—from time to time. For example, it would be possible that the control message 4001 is broadcast by the BS 112 to multiple UEs. In some examples, it would also be possible that one or more properties are negotiated between the UE 130 and the BS 112; then, the control message 4001 may be communicated as part of such a bi-directional negotiation which may include further control messages (not shown in FIG. 9A).

At 3002, a user-data message 4002 is communicated. For example, the user-data message 4002 may be communicated on the payload channel 263. For example, the user-data message 4002 may be communicated along the data connection 160, e.g., as part of a bearer, etc.

Then, there is no more data to be communicated between the UE 130 and the BS 112. Transmit buffers are empty. This may trigger a timer. For example, the timer may be implemented at the UE 130. After a certain timeout duration set in accordance with the inactivity schedule 201, the main receiver 1351 of the UE 130 is transitioned into the inactive state 3099 from the active state 3098, 3003. This is done in order to reduce the power consumption of the UE 130. For example, prior to the transitioning the main receiver 1351 to the inactive state 3099, it would be possible to release the data connection 160 by appropriate control signaling on the control channel 262 (not illustrated in FIG. 9A). 4001 and 4002 are communicated with the main receiver 1351.

Figure 10:
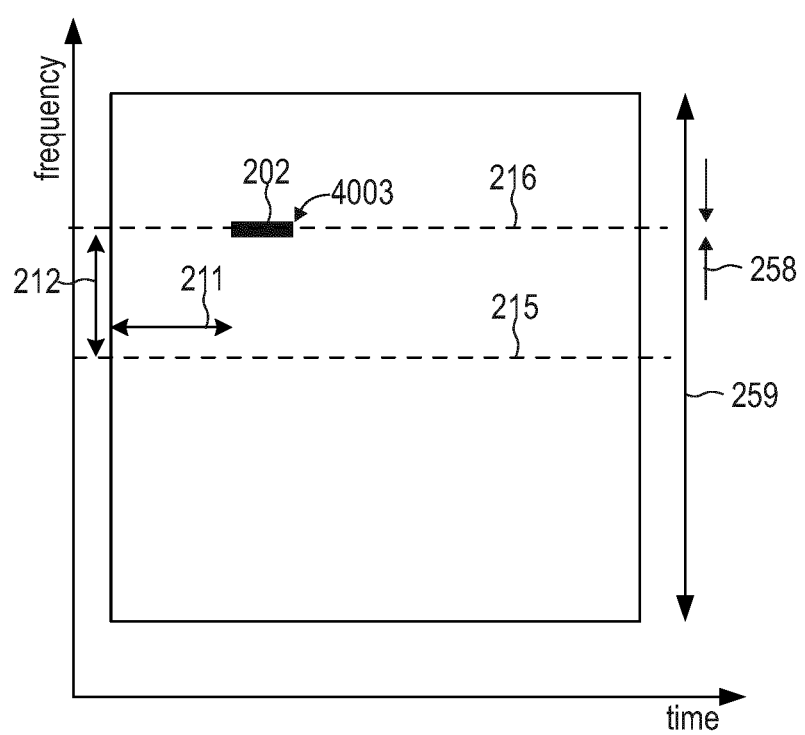
FIG. 10 schematically illustrates a time-frequency resource allocated to a wake-up signal according to various examples.

Multiple transmission opportunities for communicating the wake-up signal 4003 are then implemented by reoccurring resources 202. For example, the resources 202 may be radio resources defined in a time-frequency grid used for communication with the main receiver 1951; this avoids interference with further UEs communicating with the BS 112. This is illustrated in FIG. 10. For example, the resources 202 may correspond to resource blocks of the time-frequency resource grid, the blocks including multiple resource elements. For example, the resources 202 may correspond to resource elements of the time-frequency resource grid; a single resource element may be defined by a symbol modulated by a certain constellation. Hence, the resource element may occupy a frequency bandwidth which corresponds to the bandwidth of the corresponding subcarrier.

Communication with the main receiver 1351 and communication with the low-power receiver 1352 may employ different carriers 215, 216. The bandwidth 258 of the carrier 216 may be much smaller than the bandwidth 259 of the carrier 215.

The frequency bandwidth of the resources 202 may be smaller than the frequency bandwidth 259 of the carrier 215 used for communication with the main receiver 1351. For example, the resources 202 may be defined with a certain frequency offset 212 with respect to a center carrier frequency 215 employed for communicating with the main receiver 1351. In particular, it may be possible that the center frequency of the carrier 216 employed for communicating the wake-up signal 4003 with the low-power receiver 1352 is offset from the center frequency of the carrier 215 employed for communicating with the main receiver 1351.

For example, the resources 202 may be defined with respect to a certain time offset 211 with respect to subframes or frames used for communicating on the wireless link 101. Here, time synchronization with the BS 112 may be implemented. Alternatively, time synchronization may not be required and the low-power receiver may simply listen to the ongoing traffic for a certain time duration with some overhead to account for timing drifts.

The reoccurring resources 202 may be arranged with a fixed periodicity. Generally, the reoccurring resources 202 may be arranged in accordance with a certain timing. Frequency hopping is possible. For example, indication of the reoccurring resources may specify the timing or periodicity, the frequency and time offset.

In some examples, the reoccurring resources 202 may be aligned with a discontinuous reception cycle of a respective mode according to which the UE 130 operates.

At some point in time, the BS 112 transmits a wake-up signal 4003, 3004. This may be because there is DL data—e.g., payload data or control data—scheduled for transmission to the UE 130 in a transmit buffer. Another trigger criteria for transmitting the wake-up signal 4003 are conceivable. The wake-up signal 4003 is received by the UE 130.

In response to receiving the wake-up signal 4003, the main receiver 1351 of the UE 130 is transitioned to the active state 3098, 3005.

Then, at 3006, a paging indicator 4004 is transmitted by the BS 112 to the UE 130. The paging indicator 4004 is received by the main receiver 1351. For example, the paging indicator may be transmitted on channel 262, e.g. PDCCH. For example, the paging indicator may include a temporary or static identity of the UE 130. The paging indicator or may be indicative of a plurality of UEs, because the indicator may be derived from unique identities of the UEs such as the International Mobile Subscriber Identity (IMSI) or the like in an ambiguous manner. Examples of the identity of one or more UEs that may be included in paging indicator or 4004 may include a Paging Radio Network Temporary Identifier (P-RNTI) in the 3GPP LTE framework. The P-RNTI may not refer to a particular UE, but to a group of UEs. The P-RNTI may be derived from the IMSI of the subscriber to be paged and constructed by the BS.

For example, in case the wake-up signal is already UE specific, this paging indicator may be just a control message and include Cell Radio Network Temporary Identifier (C-RNTI), e.g., instead of the P-RNTI. For example, it is possible that the paging indicator does not include a UE-specific indicator, but merely includes, e.g., a cell-specific indicator.

The paging indicator may also include information on a MCS used for communicating a paging message 4005 at 3007. The paging message 4005 may be communicated on a shared channel 263, e.g., PDSCH. Generally, the paging indicator 4004 and the paging message 4005 may be communicated on different channels. The paging message 4005 may be modulated and encoded according to the MCS indicated by the paging indicator 4004. Thus, it may be required that the UE 130 receives, firstly, the paging indicator 4004 and, secondly, the paging message 4005.

Then, at 3008, a data connection 160 is set up between the UE 130 and the BS 112. This may include a random access procedure and a Radio Resource Control (RRC) set up.

Finally, a UL or DL user-data message 4002 is communicated using the newly set up data connection 160 at 3009.

As will be appreciated from FIG. 9A, upon transitioning the main receiver 1351 to the active state 3098 at 3005, the data connection 160 needs to be reestablished. For this reason, the UE 130 operates in idle mode—when no data connection 160 is set up or maintained—during the inactive state 3099 of the main receiver 1351. However, in the various examples described herein, other implementations of the particular mode in which the UE 130 operates during the inactive state 3099 are conceivable.

Figure 9B:
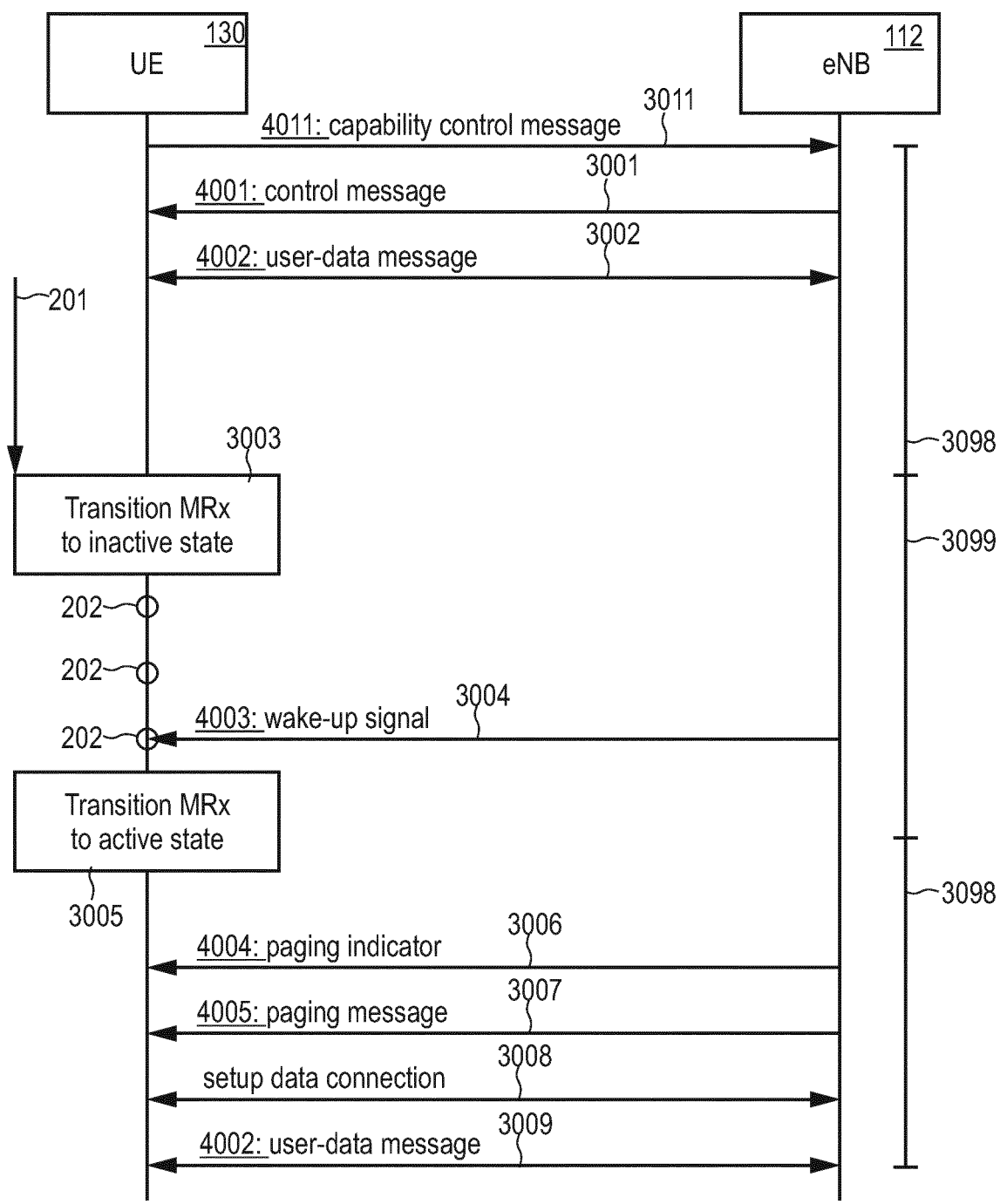
FIG. 9B is a signaling diagram of communication between the BS and the UE according to various examples.

FIG. 9B is a signaling diagram. FIG. 9B illustrates aspects with respect to communicating between the UE 130 and the BS 112. FIG. 9B illustrates aspects with respect to transmitting and/or receiving (communicating) a wake-up signal 4003.

The example of FIG. 9B generally corresponds to the example of FIG. 9A. In FIG. 9B, a capability control message 4011 is additionally communicated at 3011. The capability control message 4011 is transmitted by the UE 130 and received by the BS 112. The capability control message 4011 is indicative of a capability of the UE 130 to support various candidate sequence designs of the wake-up signal 4003. For example, the capability control message 4011 could be indicative of certain ranges of parameters associated with the sequence design which are generally acceptable for the low-power receiver 1352. For example, the low-power receiver 1352 may only be capable of receiving wake-up signals of a length below a certain threshold, e.g., due to voltage—current drain characteristics, etc. Then, this may be indicated by the respective capability and taking into account when determining, e.g., the base sequence and/or the spreading sequence to be used for constructing the wake-up signal 4003. Other examples of limited capabilities of the low-power receiver 1352 are conceivable. Such techniques help to tailor the sequence design of the wake-up signal 4003 to the capabilities of the UE 130.

In some examples, the capability of the UE 130 may change from time to time, e.g., depending on whether extended coverage (CE) using multiple repetitions of data encoded according to the same redundancy version is used or not. For example, the network may be designed to support the wake-up signal only for the UE in normal coverage. If the UE transitions from normal coverage to CE, then the UE may indicate a new capability of not supporting the wake-up signal, anymore.

In the scenario of FIG. 9B, the inactivity schedule 201 of the main receiver 1531 is supported by the UE 130. Therefore, the scenario as already explained above with respect to FIG. 9A commences. Generally, communicating of the wake-up signal 4003 may selectively be executed depending on the capability of the UE 130 to support the inactivity schedule 201.

Figure 11:
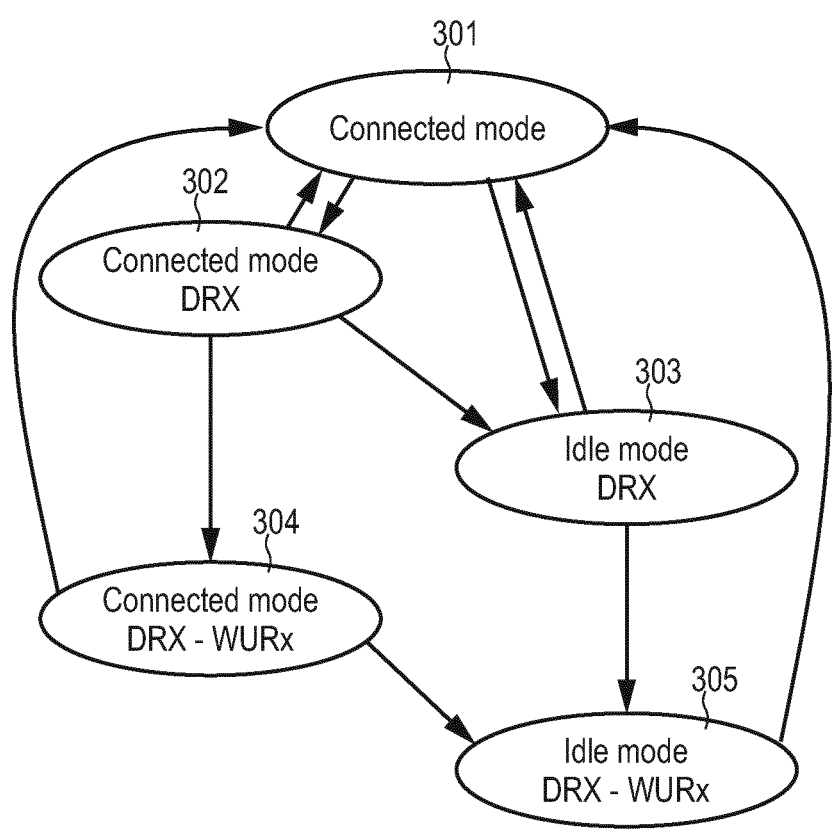
FIG. 11 schematically illustrates different modes of operation of the UE according to various examples.

FIG. 11 illustrates aspects with respect to different modes 301-305 in which the UE 130 can operate.

During connected mode 301, a data connection 160 is set up. For example, a default bearer and optionally one or more dedicated bearers may be set up between the UE 130 and the network 100. In order to reduce the power consumption, it is then possible to transition from the connected mode 301 to a connected mode 302 which employs a discontinuous reception (DRX) cycle of the main receiver 1351. The DRX cycle includes on durations and off durations. During the off durations, the main receiver 1351 is unfit to receive data. The timing of the DRX cycle is synchronized between the UE 130 and the BS 112 such that the BS 112 can align any DL transmission with the on durations of the connected mode DRX cycle. The bearer 160 is maintained set-up in mode 302.

To achieve a further power reduction, it is possible to implement in idle mode 303. The idle mode 303 is, again, associated with the DRX cycle of the main receiver 1351 of the UE 130. However, during the on durations of the DRX cycle in idle mode 303, the main receiver 1351 is only fit to receive paging indicators and, optionally, paging messages. For example, this may help to restrict the particular bandwidth that needs to be monitored by the main receiver 1351 during the on durations of the DRX cycles in idle mode 303. This may help to further reduce the power consumption—e.g., if compared to the connected mode 302.

In modes 301-303 the main receiver 1351 is operated in the active state 3098. The low-power receiver 1352 is not required.

In the example of FIG. 11, two more modes 304, 305 are illustrated. Both modes 304, 305 relate to scenarios where the main receiver 1351 is operated in the inactive state 3099. Hence, during the modes 304, 305, the main receiver 1351 is persistently switched off and, in particular, not switched on during any on durations. Differently, during the modes 304, 305, the low-power receiver 1352 is at least sometimes operating in an active state, e.g., according to a respective DRX cycle of the low power receiver 1352.

In mode 304, the data connection 160 is maintained between the UE 130 and the network 100. Transition into mode 304 may be determined by the inactivity schedule 201. In mode 304, it would be possible that a further signal which is communicated in response to communicating the wake-up signal directly encodes a user-data message associated with the data connection 160. No random access procedure is required. Thus, in such an example, the data connection 160 between the network 100 and the UE 100 may be established and the wake-up signal may then be communicated while the connection 160 is established. In such a scenario, the BS 112 may have to select between transmitting a DL scheduling grant indicative of resources allocated to a DL user-data message on the DL shared channel and transmitting the wakeup signal, depending on the inactivity schedule 201 of the main receiver 1251. The UE 130, in mode 304, is not required to repeatedly listen for downlink control information (DCI). Mode 304 offers low latency transmission of payload data, possibly at the expense of more complicated bookkeeping, e.g., by the BS 112.

Differently, in the mode 305, the data connection 160 is not maintained between the UE 130 and the network 100. A random access procedure, triggered by paging, may be required (cf. FIGS. 9A and 9B).

In the example of FIG. 11, scenarios illustrated, where both low-power receiver modes 304, 305 implement a DRX cycle of the low-power receiver 1532. Hence, the wake-up signal 4003 is communicated in accordance with the timing of the DRX cycle. However, generally, it would also be possible to implement the modes 304, 305 such that the low-power receiver 1352 is persistently fit to receive wake-up signals, i.e., does not implement on durations and off durations.

Figure 12:
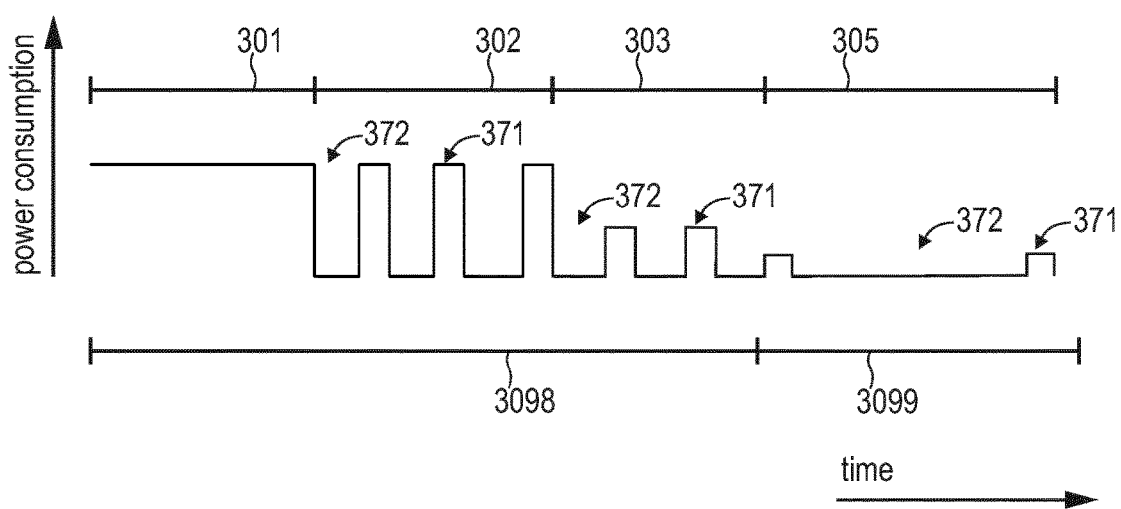
FIG. 12 schematically illustrates power consumption for different modes of operation of the UE according to various examples.

FIG. 12 illustrates aspects with respect to switching between the different modes 301-305. First, the UE 130 operates in the connected mode 301. This causes a persistent power consumption at a high level. Then, in order to reduce the power consumption, the connected mode 302 employing DRX is activated. Here, the on durations 371 and the off durations 372 of the main receiver 1351—operating in active state 3098—are illustrated.

To further reduce the power consumption, next, the idle mode 303 is activated. This is accompanied by releasing the data connection 160. Again, the idle mode 303 employs a DRX cycle including on durations 371 and off durations 372. The on durations 371 in mode 303 are associated with a lower power consumption if compared to the on durations 371 in connected mode 302, because in the idle mode 303, the capability of the main receiver 1351 can be reduced if compared to the connected mode 302. During idle mode 303, the main receiver 1351 only expects reception of paging indicators or paging messages.

Finally, to even further reduce the power consumption, the idle mode 305 is activated. Upon transitioning into the idle mode 305, the main receiver 1351 is transitioned from the active state 3098 to the inactive state 3099. A DRX cycle is again implemented including on durations 371 and off durations 372.

Figure 13:
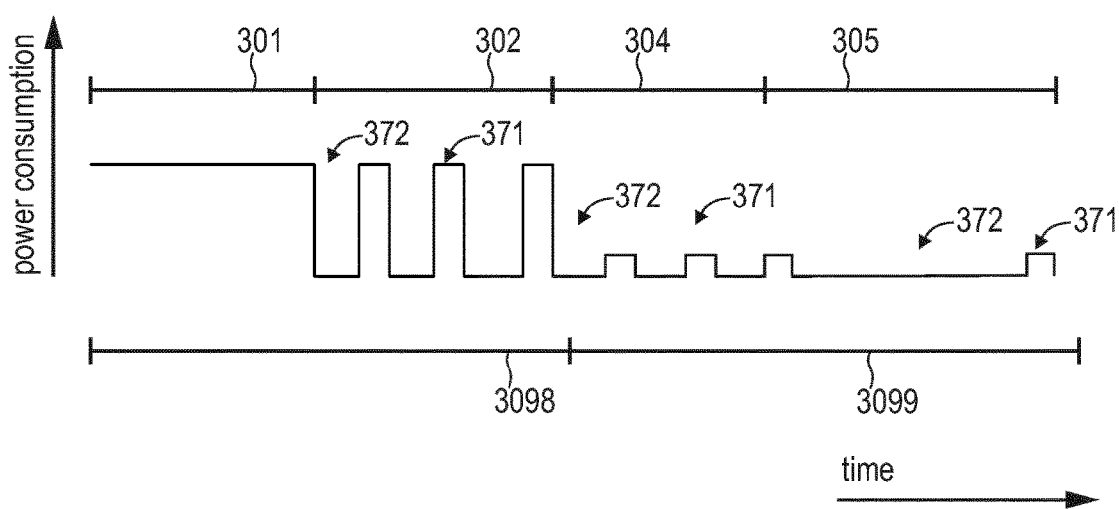
FIG. 13 schematically illustrates power consumption for different modes of operation of the UE according to various examples.

FIG. 13 illustrates aspects with respect to different modes 301-305 in which the UE 130 can operate.

The example of FIG. 13 generally corresponds to the example of FIG. 12. Here, instead of activating the idle mode 303, the connected mode 304 is activated. When operating the UE 130 in the connected mode 304, the data connection 160 is maintained, but the main receiver 1351 is transitioned into inactive mode 3099. Thus, as will be appreciated, the data connection 160 may be maintained for mode 304 in which wake-up signals are communicated.

Figure 14:
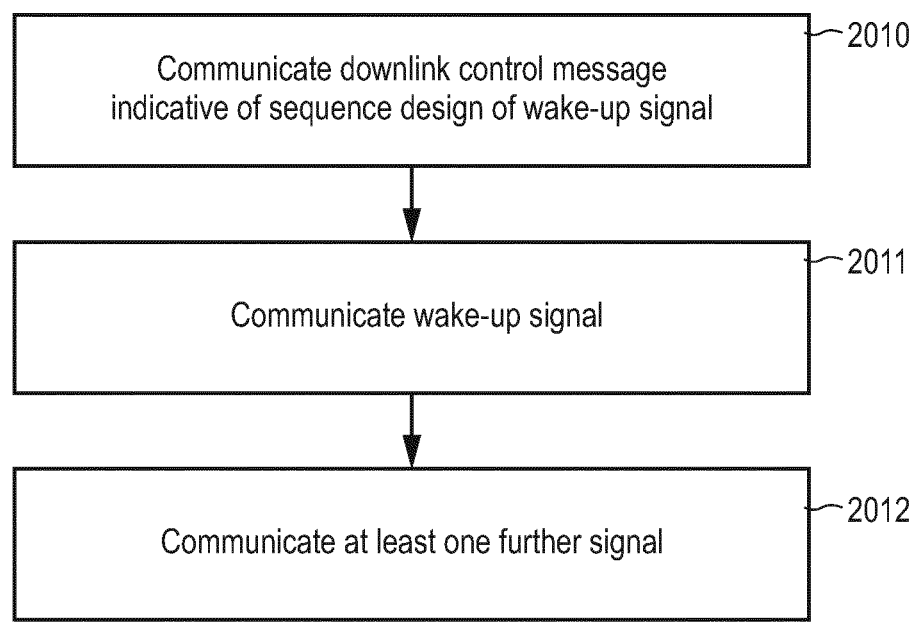
FIG. 14 is a flowchart of a method according to various examples.

FIG. 14 is a flowchart of a method according to various examples. For example, the method could be executed by the UE 130 (cf. FIG. 4). Alternatively or additionally, the method could be executed by the BS 112 (cf. FIG. 3).

First, in 2010, a downlink control message is communicated between the BS and the UE (see, e.g., DL control message 4001 of FIG. 9A). For example, the downlink control message may be transmitted by the BS. Alternatively or additionally, the downlink control message may be received by the UE.

The downlink control message is indicative of a sequence design of a wake-up signal. For example, the sequence design may include a spreading parameter and/or a scrambling parameter. For example, the sequence design may include a sequence length of a base sequence of the wake-up signal. For example, the type of the base sequence may be specified by the sequence design, e.g., whether the wake-up signal uses a random set of bits, or Zadoff-Chu sequence as the base sequence, etc. Hence, different sequence designs may rely on different codebooks of the base sequence. By using different codebooks, it may be possible to employ more robust detection of a wake-up signal. In particular, shorter correlators may be employed for de-spreading and/or de-coding. This facilitates a flexible sequence design with large address-space scalability.

As a general rule, the downlink control message may specify one or more exact parameter values of the sequence design. Alternatively or additionally, it would also be possible that the downlink control message specifies ranges of one or more parameter values of the sequence design. For example, a maximum sequence length of the base sequence of the wake-up signal may be specified. Then, the particular sequence length employed when communicating the wake-up signal may be as long as or shorter than the maximum sequence length.

Next, in 2011, a wake-up signal is transmitted (see, e.g., FIG. 8B wake-up signal 4003) and/or received (communicated). This is in accordance with the sequence design indicated in 2010. For example, the wake-up signal may be transmitted by a BS. Alternatively or additionally, the wake-up signal may be received by a UE. The wake-up signal is communicated between the BS and a main receiver of the device.

Next, at least one further signal is communicated, 2012. The at least one further signal is communicated between the BS and the UE. For example, the at least one further signal may be an uplink signal and/or a DL signal. For example, the at least one further signal may be transmitted by the BS. Alternatively or additionally, the at least one further signal may be received by the UE. Alternatively or additionally, the at least one further signal may be transmitted by the UE. Alternatively or additionally, the at least one further signal may be received by the BS. An example would be at least one of the paging signals 4004, 4005 in FIG. 9A.

Figure 15:
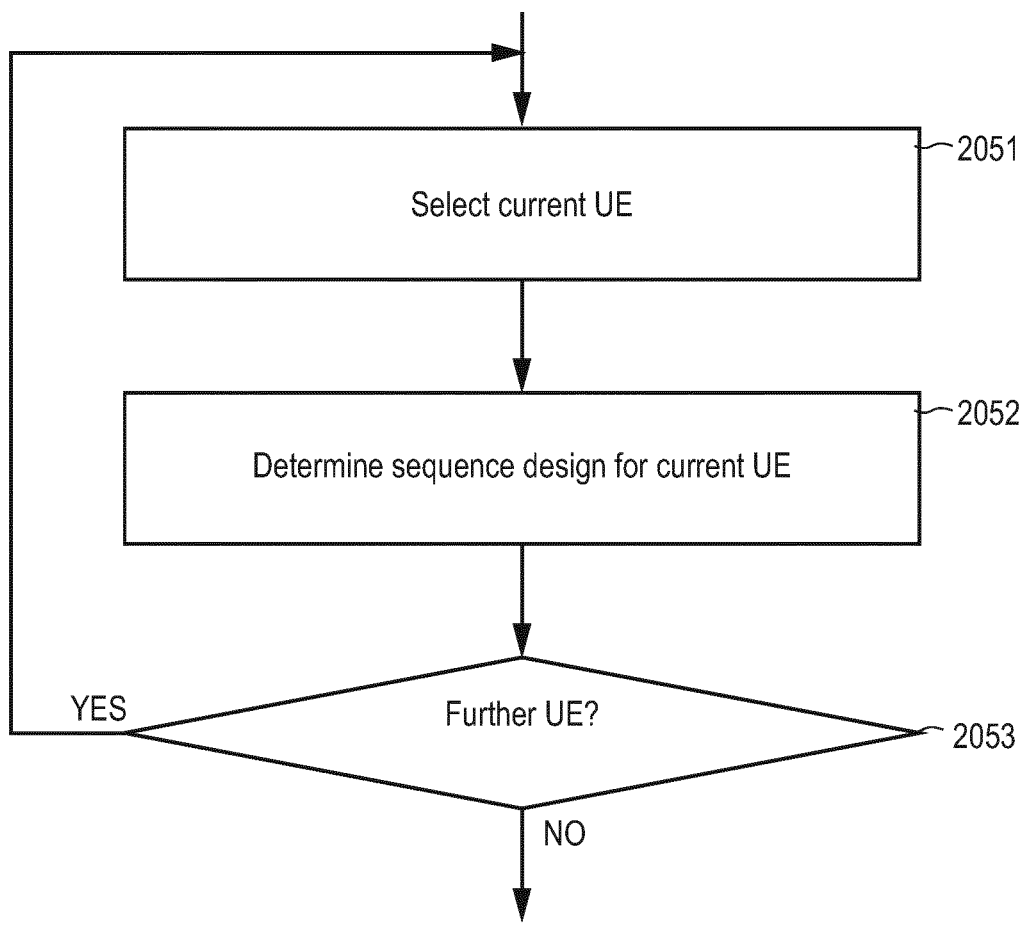
FIG. 15 is a flowchart of a method according to various examples.

FIG. 15 is a flowchart of a method according to various examples. FIG. 15 illustrates aspects with respect to determining the sequence design of a wake-up signal. In particular, FIG. 15 illustrates aspects with respect to determining the sequence design of wake-up signals address to different UEs. For example, the method according to FIG. 15 may be executed by the control logic 1122 of the BS 112 (cf. FIG. 3).

First, in 2051, a current UE is selected. For example, the current UE may be selected from a plurality of UEs which are connected to the BS. For example, the current UE may be selected from a plurality of UEs which are connected to a given cell of a cellular network.

Then, in 2052, the sequence design is determined for the current UE selected in 2051. Generally, it may be possible to determine different sequence designs for different UEs. In other words, it may be possible that the sequence design determined for the current UE in 2052 is unique for that current UE. Such a scenario may be appropriate where code division multiplexing is employed for distinguishing between different UEs. Here, for example, different orthogonal base sequences or quasi-orthogonal base sequences may be determined for different UEs. Then, reception of a first wake-up signal by a first UE is not correlated to reception of a second wake-up signal by a second UE.

A further effect of using a unique sequence design is that individual UEs can be unambiguously addressed by the particular wake-up signal. Then, it may not be required to include unique identities of the respective UEs in any subsequently communicated one or more further signals.

In 2053, this check whether a further UE is available in the plurality of UEs. If this is the case, the further UE is selected as the current UE in 2051. Otherwise, the sequence design has been determined for all available UEs. Then, it may be possible that communication of the wake-up signal commences (cf. FIG. 14: 2011).

When determining the sequence design in 2052, different decision criteria can be taken into account. For example, it may be possible to take into account a signal quality of the wireless link between the UE and the BS. For example, if the signal quality on the wireless link is poor, then a more robust sequence design may be selected. For example, the spreading parameter may be selected such that a longer spreading code is applied. Then, even individual errors the received wake-up signal may be compensated for by the longer length of the resulting sequence of the wake-up signal. In various examples described herein, it may be possible that the signal quality of the wireless link is determined based on a measurement report received by the BS from the UE. Alternatively or additionally, the signal quality of the wireless link may be determined based on the channel sensing performed by the BS.

A further example of a decision criterion is the mobility of the UE. The mobility of the UE may describe a tendency of the UE to move. For example, the mobility of the UE may describe a velocity of the UE. For example, the mobility of the UE may describe a frequency of handovers of the UE. For example, if the mobility of the UE is comparably high, it can be expected that the signal quality associated with the wireless link between the UE and the BS degrades significantly in the future. Then, in may be possible to select a more robust sequence design.

A further example of a decision criterion may relate to the receiver sensitivity of the low-power receiver. For example, different sensitivity capabilities may be provided by different low-power receivers. Such capabilities may be indicated in the capability control message transmitted by the UE and received by the BS.

Thus, various decision criteria may be considered, such as one or more of the following: (I) measured radio signal quality parameters (uplink channel characteristics); (II) UE reported radio signal quality parameters (downlink channel characteristics); (III) UE capabilities, e.g. the UE category, or if the UE wake-up radio characteristics is known. (IV) Low-power receiver capabilities: It could be that a passive low-power receiver that has high sensitivity level, e.g. −50 dBm, while an active WuRx has lower sensitivity level, e.g. −100 dBm; and/or (V) Estimated UE mobility: e.g., UE may indicate it is stationary device, or network may have knowledge about history of cell changes, etc.

In some examples, it is possible to determine the sequence design alike for multiple UEs associated with a particular UE group. For example, a group of a plurality of UE groups may be determined with which the particular UE is associated. Then, the sequence design may be determined depending on the particular UE group.

Figure 16:
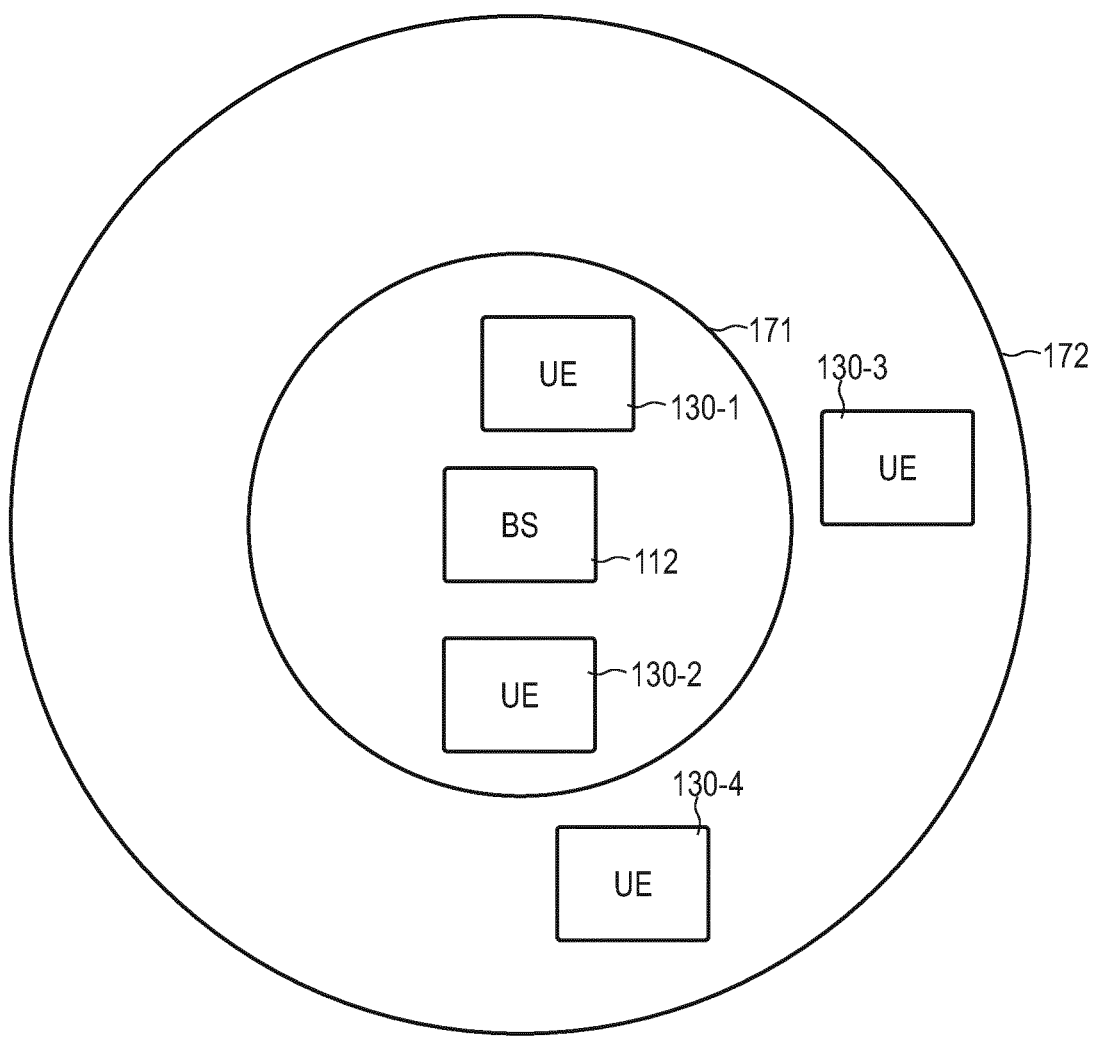
FIG. 16 schematically illustrates various groups of UEs associated with different sequence designs of the wake-up signal according to various examples.

FIG. 16 illustrates aspects with respect to UE groups 171, 172. As illustrated in FIG. 16, the UEs 130-1, 130-2 are associated with the group 171; whether UEs 130-3, 130-4 associated with the group 172. The groups 171, 172, in the example of FIG. 16, are defined with respect to a distance between the BS 112 and the UEs 130-1-130-4. In other examples, other grouping parameters may be employed, e.g.: direction of UEs with respect to the BS 112; signal quality associated with the wireless link 101 between the respective UE 130-1-130-4 and the BS 112; capability of the low-power receivers 1352 of the UEs 130-1-130-4; etc.

By determining sequence designs for a number of groups of UEs, a simpler selection of the appropriate sequence design can be achieved.

Summarizing, above Wake-up radio (WUR) mechanisms have been discussed. In these types of approach, a low-power low-performance wake-up receiver (WuRx) wakes up and listens to the channel (based on a certain schedule) for potential communications, i.e., a wake-up signal. Whenever the wake-up signal is detected by the WuRx, the more power hungry main receiver is powered up. The main benefit of WUR mechanisms is to be able to design a system with reachable nodes with low idle listening power consumption and reduced communication delay.

In some examples, it is possible to select one sequence design that applies to UEs within coverage. In other examples, it is possible to define different wake-up signals for different UEs, e.g., on a per-UE basis or on a per-group basis. In particular, the sequence design of the wake-up signals may be varied for different UEs. This enables to tailor the wake-up signals depending on the particular requirements of the UEs. For example, different UEs may impose different requirements in terms of coverage or receiver sensitivity. This enables to reliably detect wake-up signals. Then, unnecessary wake-ups due to overhearing are avoided. False positives can be reduced.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while above various scenarios have been disclosed with respect to a stationary BS, in other examples, the BS may be implemented by a mobile entity; in such a scenario, the BS is sometimes labelled relay.

For further illustration, while above various examples have been described with respect to the 3GPP LTE protocol, in other examples, other protocols may be employed. For example, while reference has been primarily made to the PDCCH above, respective control channels may also refer to MPDCCH (MTC PDCCH), NPDCCH (NB-IoT PDCCH) or any similar control channel in other radio access techniques.

For further illustration, above, various examples have been described where the wake-up signal is received by a low-power receiver. Such techniques may be likewise employed in a scenario where there is no dedicated low-power receiver, but a main receiver which may operate in a low-power state and a high-power state. Then, the wake-up signal may be received in the low-power state of the main receiver. The various examples described herein may all benefit from such a receiver architecture including only the main receiver.

For still further illustration, techniques as described above can be readily applied to other kinds and types of radio access technologies and protocols, e.g., Similar techniques can also be potentially applied to 5G New Radio (NR), and NR-IoT.

The invention claimed is:

1. A method, comprising:
communicating, between a base station and a terminal including a receiver, a control message indicative of a limited capability of the receiver reduced to supporting a set of candidate sequence designs when operated in a low power mode;
determining a sequence design of a wake-up signal based on the limited capability of the receiver when operated in the low power mode;
communicating, between the base station and the terminal, a downlink control message indicative of a sequence design of the wake-up signal,
communicating, between the base station and the terminal, the wake-up signal in accordance with the determined sequence design, and
in response to communicating the wake-up signal between the base station and the terminal, communicating at least one further signal between the base station and the terminal.

2. The method of claim 1, wherein:
the sequence design comprises at least one of a spreading parameter and a scrambling parameter of a sequence generator for modifying a base sequence of the wake-up signal.

3. The method of claim 2, wherein:
the spreading parameter is indicative of a range of spreading factors.

4. The method of claim 1, wherein:
the sequence design comprises a sequence length of a base sequence of the wake-up signal modified by a sequence generator.

5. The method of claim 1, wherein:
the sequence design comprises a base sequence of the wake-up signal optionally selected from the group comprising:
a randomly generated sequence;
a Zadoff-Chu sequence;
a sequence selected from a set of orthogonal or quasi-orthogonal sequences; and
a Walsh-Hadamard sequence.

6. The method of claim 5, wherein:
the base sequence is uniquely associated with the terminal.

7. The method of claim 1, wherein:
the sequence design comprises a checksum protection parameter.

8. The method of claim 1, wherein:
the sequence design comprises a preamble parameter.

9. The method of claim 1, wherein:
the downlink control message is indicative of a repetition level for coverage enhancement when communicating the wake-up signal.

10. The method of claim 1, wherein:
the downlink control message is indicative of a range of allowed parameter values of at least one parameter of the sequence design.

11. The method of claim 1, further comprising:
determining multiple sequence designs for multiple terminals connected to the base station.

12. The method of claim 1, further comprising:
determining a group of a plurality of terminal groups, with which the terminal is associated, and
determining the sequence design depending on the determined group.

13. The method of claim 12, wherein:
the group is determined based on at least one of the following: a distance between the terminal and the base station; a direction of the terminal with respect to the base station; and a signal quality of the wireless link between the terminal and the base station.

14. The method of claim 1, further comprising:
determining the sequence design depending on a signal quality of a wireless link between the base station and the terminal.

15. The method of claim 1, further comprising:
determining the sequence design depending on a mobility of the terminal.

16. The method of claim 1, wherein the communicating the control message between the base station and the terminal comprises:
communicating a capability control message indicative of a limited power-related capability of the receiver of the terminal.

17. The method of claim 1, further comprising:
cross-correlating a time-domain and/or frequency-domain bit/symbol sequence of the wakeup signal and a predefined reference sequence, and
based on said cross-correlating: selectively waking up a main receiver of the terminal.

18. The method of claim 1, wherein:
the wake-up signal and the further signal are modulated onto different carrier frequencies and/or using different constellations and/or using different bandwidths and/or using different modulations.

19. The method of claim 1, wherein:
the terminal is configured to operate in an idle mode when communicating the wake-up signal which is different to a further idle mode in which paging signals are communicated.

20. A device comprising control circuitry configured to:
communicate, between a base station and a terminal including a receiver, a control message indicative of a limited capability of the receiver reduced to supporting a set of candidate sequence designs when operated in a low power mode;
determine a sequence design of a wake-up signal based on the limited capability of the receiver when operated in the low power mode;
communicate, between the base station and the terminal, a downlink control message indicative of a sequence design of the wake-up signal;
communicate, between the base station and the terminal, the wake-up signal in accordance with the determined sequence design; and
in response to communicating the wake-up signal between the base station and the terminal, communicate at least one further signal between the base station and the terminal.

* * * * *